United States Patent
Kim

(10) Patent No.: US 6,552,981 B2
(45) Date of Patent: Apr. 22, 2003

(54) DATA RECORDING METHOD FOR AN OPTICAL RECORDER/PLAYER WHICH CAN PERFORM STABLE DATA RECORDING BY CONTROLLING A LASER RECORDING POWER OF THE OPTICAL RECORDER/PLAYER

(75) Inventor: Gyu Jin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 09/756,856

(22) Filed: Jan. 10, 2001

(65) Prior Publication Data

US 2003/0035353 A1 Feb. 20, 2003

(30) Foreign Application Priority Data

Jan. 11, 2000 (KR) .............................................. 00-1202

(51) Int. Cl.$^7$ ................................................. G11B 5/09
(52) U.S. Cl. ................................. 369/47.51; 369/53.26
(58) Field of Search ............................. 369/47.5, 47.51, 369/47.53, 47.55, 53.26, 53.27, 53.29, 30.03, 32.01, 33.01, 116

(56) References Cited

U.S. PATENT DOCUMENTS 5,841,747 A * 11/1998 Kubota et al. ............ 369/53.36
6,028,834 A * 2/2000 Kuroda et al. .............. 369/116
6,052,347 A * 4/2000 Miyata .................... 369/47.53

* cited by examiner

Primary Examiner—Paul W. Huber
(74) Attorney, Agent, or Firm—Birch, Stewart, Kolasch & Birch, LLP

(57) ABSTRACT

In the data recording method for an optical recorder/player, data and start address information for recording the data are received, and an optimum power control (OPC) is performed in a data recording region of an optical recording medium corresponding to the start address. A laser recording power suitable for recording the received data in the data recording region corresponding to the start address is set based on the OPC, and the received data is recorded in the data recording region corresponding to the start address using the set laser recording power.

8 Claims, 3 Drawing Sheets

DATA RECORDING METHOD FOR AN OPTICAL RECORDER/PLAYER WHICH CAN PERFORM STABLE DATA RECORDING BY CONTROLLING A LASER RECORDING POWER OF THE OPTICAL RECORDER/PLAYER

BACKGROUND OF THE INVENTION

1. Field of the Invention

The present invention relates to an optical recorder/player, and particularly to a data recording method for an optical recorder/player which can perform stable data recording by controlling a laser recording power of the optical recorder/player.

2. Description of the Related Art

Generally, an optical recording medium is classified into three types depending upon the possibility of a repeated recording: a read only memory (ROM) type, a write once read many (WORM) type, and a rewritable type.

As a repeatedly rewritable disc, there exists a rewritable compact disc (CD-RW) and a rewritable digital versatile disc (DVD-RAM).

An arrangement of the recording region of the CD-RW disc, as shown in FIG. 1, is divided into a power calibration area (PCA) 101, a program memory area (PMA) 102, a lead-in area 103, a program area 104, and a lead-out area 105.

The PCA 101 is a region for correcting the laser recording power for recording data on the disc, and the PMA 102 has leading address information of the track on which data is recorded in the program area 104.

The lead-in area 103 and the lead-out area 105 store information on both defect areas of the disc and data recording information stored in the program area 104. Actual data to be recorded on the disc is recorded in the program area 104.

When data is recorded on the disc, it is necessary to correct the laser recording power because of the recording sensitivity of a disc film, temperature, and a difference of the recording sensitivity caused by laser wavelength variations. In recording the data, the correction of the laser recording power is referred to as optimum power control (OPC). The performance of OPC is well known in the art, and a general OPC process will now be explained with reference to FIGS. 2 and 3.

FIG. 2 shows an example of a signal to be detected when reproducing the data recorded on the disc through the OPC process, and FIG. 3 shows a variation of the gamma and modulation according to the laser recording power in the OPC process.

Data is recorded on the PCA 101 of the disc for 15 absolute time in pregroove (ATIP), with the laser recording power being changed at an interval of 1 ATIP. After the data is recorded as described above, the recorded data is reproduced at each laser recording power, and the modulation m is obtained from a peak and a bottom of an RF waveform as shown in FIG. 2 ($m=I_{11}/I_{top}$).

Also, the gamma is derived from the following equation (1) to calculate the variation of the gamma and the modulation depending upon the laser recording power as shown in FIG. 3.

$$\text{Gamma} = dm/dPw \times Pw/m \quad (1)$$

Meanwhile, a target power satisfying a target gamma value in FIG. 3 is obtained based on reading the target gamma recorded on the disc. Using a multiplication factor recorded on the disc, an optimum write power (Pwo) is obtained from the following equation 2.

$$P_{wo} = (\text{multiplication factor}) \times P_{target} \quad (2)$$

where, the target gamma and the multiplication factor are information previously recorded when the disc is manufactured.

As described above, the OPC of the optical recorder/player is executed on the PCA 101 of the disc only to determine the laser recording power suitable for recording the data.

When data is recorded in all the data recording regions using the laser recording power set from the result of the OPC performed on the PCA 101, a problem arises. The data recording characteristic of each data recording region on the disc may be different, and a problem arises in that the optimum laser recording power may not be set for recording data in each data recording region.

SUMMARY OF THE INVENTION

Therefore, an object of the invention is to provide a data recording method for an optical recorder/player which can perform a stable data recording by controlling a laser recording power of the optical recorder/player to be in an optimum state with respect to respective data recording regions when recording data on an optical disc.

In accordance with the present invention, the above object is accomplished by providing a data recording method for an optical recorder/player, the method comprising the steps of: a) receiving data and start address information for recording the received data; b) performing an optimum power control (OPC) in a data recording region of an optical recording medium corresponding to the start address; c) setting a laser recording power suitable for recording the received data in the data recording region corresponding to the start address based on the OPC; and d) recording the received data in the data recording region corresponding to the start address using the set laser recording power.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Figure 1:
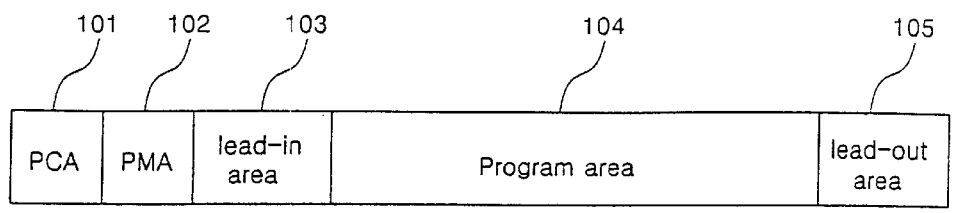
FIG. 1 is a view illustrating an arrangement of a recording region of a CD-RW disc.
Figure 2:
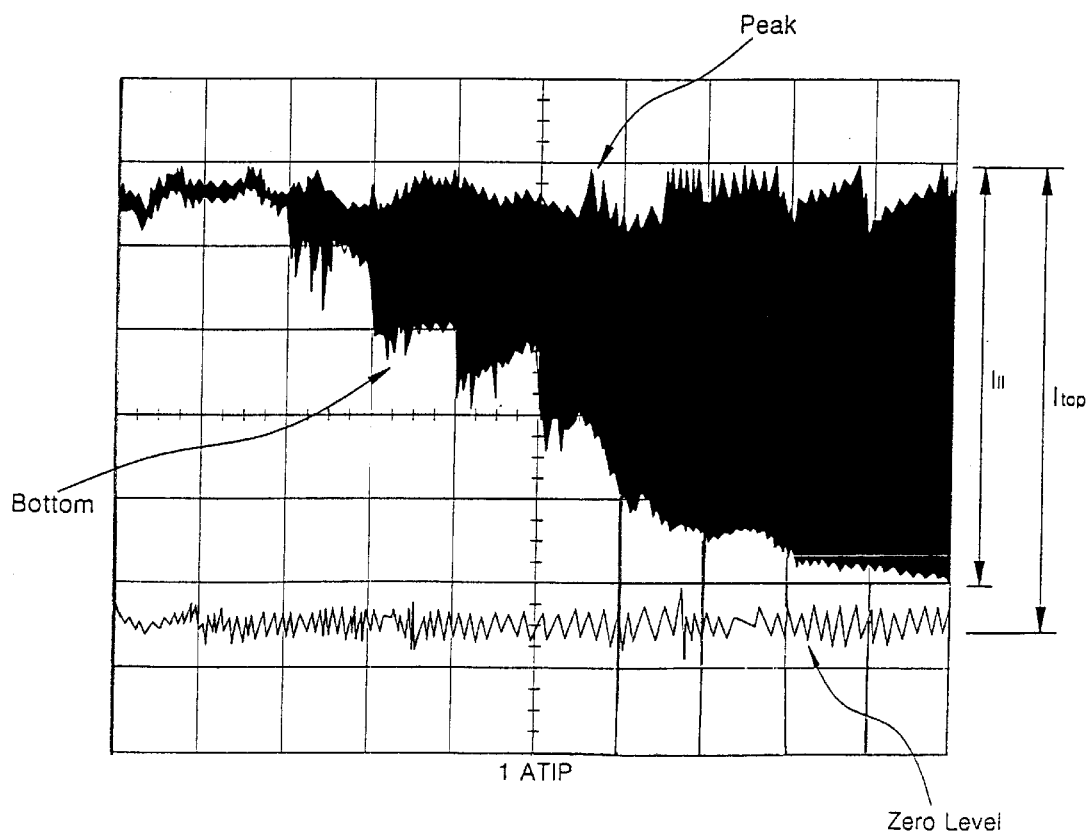
FIG. 2 is a view illustrating an example of a signal detected during reproduction of data recorded in a disc during the performance of OPC.
Figure 3:
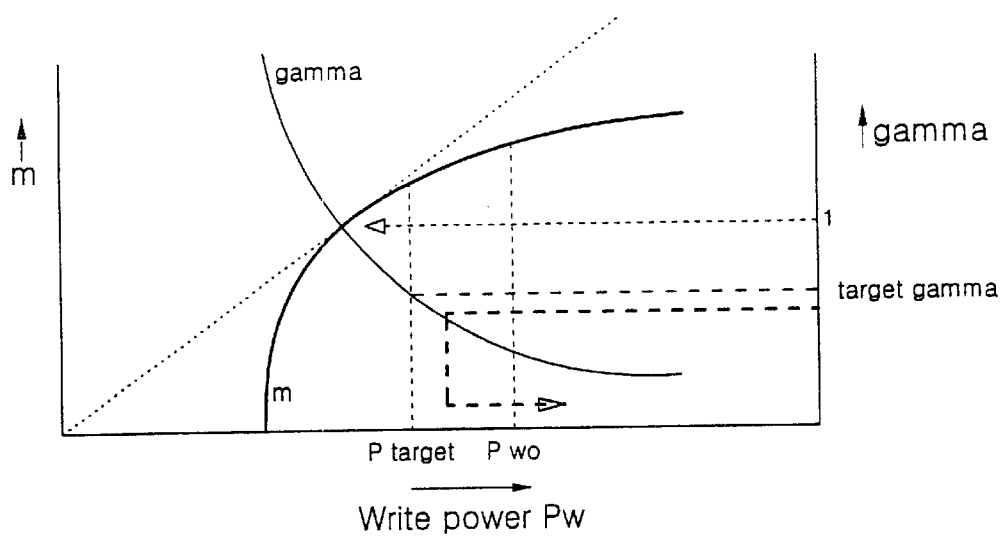
FIG. 3 is a graph showing the variation of gamma and modulation according to the laser recording power for recording data during the performance of OPC.
Figure 4:
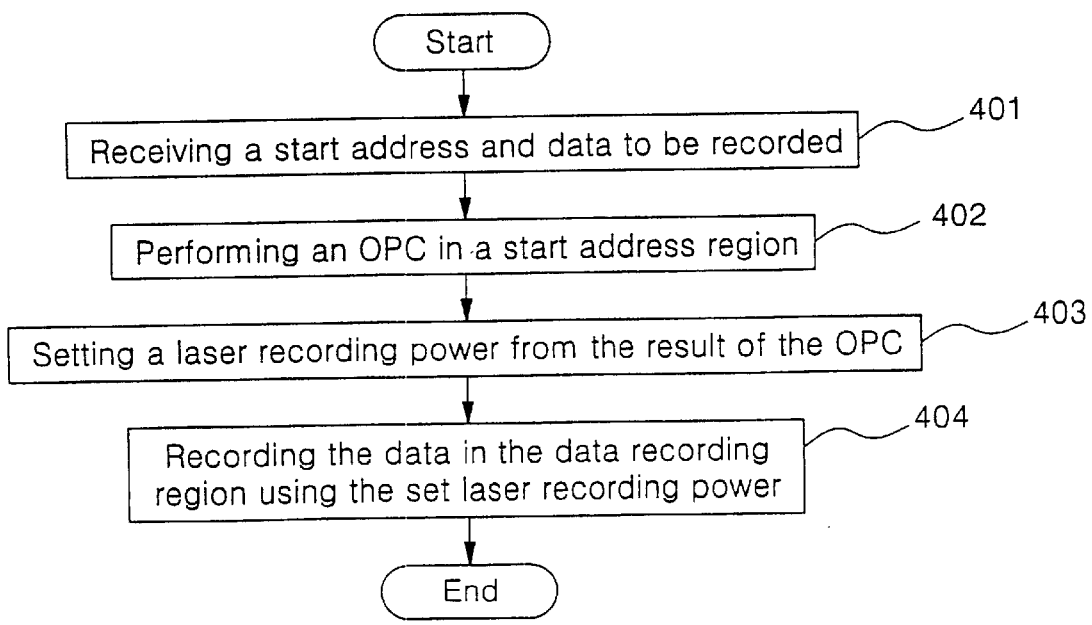
FIG. 4 is a flowchart illustrating a process of recording data performed by an optical recorder/prayer according to one embodiment of the present invention.

FIG. 4 is a flowchart illustrating a process of recording data performed by an optical recorder/player according to one embodiment of the present invention. Because the optical recorder/player of the present invention has the same structure as the conventional optical recorder/player, but operates in part according to the method of the present invention, the structure of the optical recorder/player will not be described for the sake of brevity.

Referring to FIG. 4, if the optical recorder/player receives a data recording command from a host (not shown), the optical recorder/player obtains data for recording and start address information for recording the data (step 401).

The optical recorder/player executes an OPC as described in the background section of this invention, but in a data recording region corresponding to the received start address for recording the data (step 402). And, using a target gamma value recorded on the disc, a laser recording power preferred for recording data in the data recording region corresponding to the start address is set as described in the background of the invention section based on the results of the OPC in step 402(step 403).

The optical recorder/player then records the received data in the data recording region using the set laser recording power in step 404.

Figure 5:
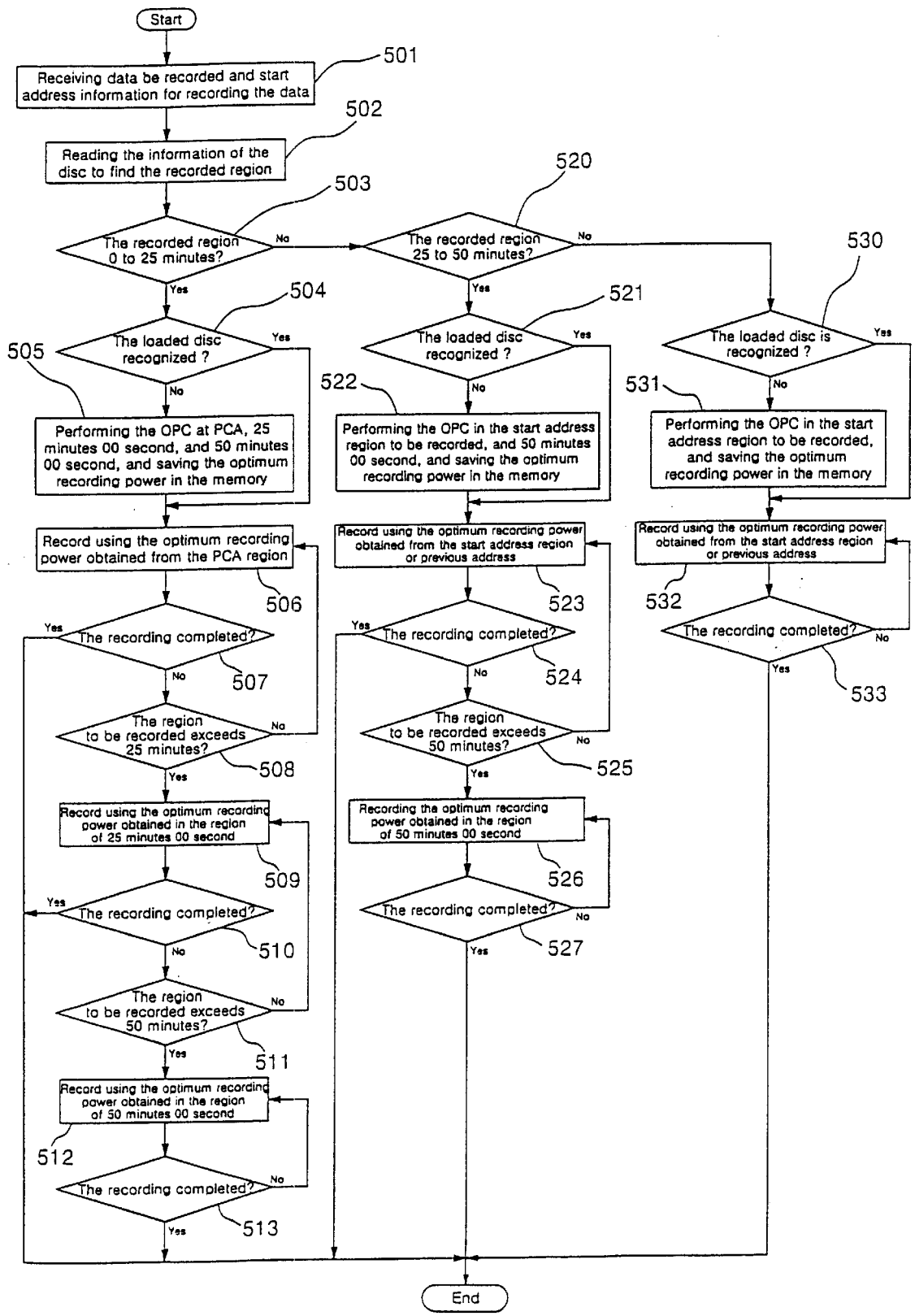
FIG. 5 is a flowchart illustrating a process of recording data performed by an optical recorder/player according to another embodiment of the present invention.

FIG. 5 illustrates a process of recording data performed by an optical recorder/player according to another embodiment of the present invention. Because the optical recorder/player of the present invention has the same structure as the conventional optical recorder/player, but operates in part according to the method of the present invention, the structure of the optical recorder/player will not be described for the sake of brevity.

Referring to FIG. 5, if the optical recorder/player receives a data recording command from a host (not shown), the optical recorder/player obtains data for recording and start address information for recording the data (step 501).

The optical recorder/player obtains data recording information of a loaded disc including the target gamma and location information on the region of the disc in which data is to be recorded (step 502). At that time, the optical recorder/player determines whether recording is to take place in a first region of the disc between 0 and 25 minutes (step 503).

If so, then in step 504 the optical recorder/player determines whether the loaded disc is recognized as a disc upon which recording has been performed previously. This recognition is performed based on any well-known identifier of the disc as will become better understood from the following description. If the loaded disc is not recognized as a disc upon which recording has been performed previously, then in step 505 the optical recorder/player executes the OPC as described in the background of the invention section at PCA, at 25 minutes 00 seconds, and at 50 minutes 00 seconds, and determines the optimum recording power as described in the background of the invention section at each of these points. Also, in step 505, the optical recorder/player stores the determined optimum recording powers at PCA, at 25 minutes 00 seconds and 50 minutes 00 seconds in association with the identifier of the disc.

Next in step 506, the optical recorder/player records the received data in the region between 0 and 25 minutes using the laser recording power at PCA set from the results of the OPC in step 505.

Returning to step 504, if the loaded disc is recognized as a disc upon which recording has been performed previously, then laser power information for the disc has already been saved in the memory of the optical recorder/player and the optical recorder/player executes the data recording process of step 506 using the saved laser power information.

The recording of the data is executed for a predetermined time, and the optical recorder/player determines whether all of the received data has recorded (step 507). If the recording has been completed, the data recording process is over.

If more data to be recorded exists, the optical recorder/player determines whether the region on which the data is to be recorded exceeds the region of 0 to 25 minutes in step 508. If the recording of data does not exceed the region of 0 to 25 minutes, the optical recorder/player returns to step 506 to execute the data recording using the laser recording power set by the OPC at the PCA.

However, if in step 508, the recording of data exceeds the region of 0 to 25 minutes, the optical recorder/player executes the data recording in step 509 using the laser recording power set by the OPC executed at 25 minutes 00 second.

After step 509, the data recording is executed for a predetermined time, and the optical recorder/player determines whether all of the received data has been recorded (step 510). If the recording has completed, the data recording process is over.

If more data for recording exists, then in step 511, the optical recorder/player determines if the recording exceeds the region of 25 to 50 minutes. If so, the optical recorder/player executes the data recording using the laser recording power set by the OPC at 50 minutes 00 second in step 512; otherwise, processing returns to step 509.

After step 512, the data recording is executed for a predetermined time, and the optical recorder/player determines whether all of the received data has been recorded. If the recording has completed, the data recording process is over. If more data is to be recorded, processing returns to step 512.

Returning to step 503, if the region in which the data is to be recorded exceeds the region of 0 to 25 minutes, the optical recorder/player determines whether the recording region exceeds the region of 25 to 50 minutes in step 520. If the recording region.falls within the region of 25 to 50 minutes, the optical recorder/player determines in step 521 whether the loaded disc is recognized in the same manner as discussed above with respect to step 504.

If the loaded disc is not recognized, the optical recorder/player executes the OPC at the start address of the recording region and at 50 minutes 00 seconds. The optical recorder/player sets the laser recording power preferable to each region from the results of the OPC, and saves the set laser power information in the memory (step 522).

And, the optical recorder/player records the received data using the laser recording power preferable to the start address from the results of the OPC executed at step 522 (step 523).

Returning to step 521, if the loaded disc is recognized, then the laser power information has been saved in the memory of the optical recorder/player, and the optical recorder/player executes the data recording process of step 523 using the optimum recording power stored for the address just preceding the start address of the recording region.

The recording of the data is executed for a predetermined time, and the optical recorder/player determines whether all of the received data has been recorded (step 524). If the recording has completed, the data recording process is over.

If more data is to be recorded, the optical recorder/player determines whether the region on which the data is to be recorded exceeds the 50 minute point of the disc. If the recording of data does not exceed 50 minutes, the optical recorder/player returns to step 523.

However, if the recording region exceeds 50 minutes, the optical recorder/player executes the data recording using the laser recording power set by the OPC at 50 minutes 00 seconds in step 526.

After step 526 the data recording is executed for a predetermined time, and the optical recorder/player determines whether all of the received data is recorded (step 527). If the recording has completed, the data recording process is over. If more data is to be recorded, processing returns to step 526.

Returning to step 520, if the region in which data is to be recorded exceeds the 50 minute point on the disc, the optical recorder/player determines whether the loaded disc is recognized in step 530.

In step 530, if the loaded disc is not recognized, the optical recorder/player executes the OPC at the start address of the region in which data is to be recorded, and the optical recorder/player sets the laser recording power preferable to this region from the results of the OPC (step 531).

Then, the optical recorder/player records the received data using the laser recording power preferable to the start address set from the results of the OPC executed at step 531 (step 532).

If in step 530 the loaded disc is recognized, then the laser power information has already been saved in the memory of the optical recorder/player, and the optical recorder/player executes the data recording process of step 532 using the optimum recording power stored for the address just preceding the start address of the recording region.

The recording of the data is executed for a predetermined time, and the optical recorder/player determines whether all of the received data is recorded (step 533). If the recording is completed, the data recording process is over. If more data is to be recorded, processing returns to step 532.

The data recording method for an optical recorder/player controls a laser recording power of the optical recorder/player so that the optical recorder/player records data at a laser power optimized for the data recording region.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data recording method for an optical recorder/player, the method comprising the steps of:
   a) determining a data recording region of an optical recording medium on which data is to be recorded, the optical recording medium having a plurality of data recording regions;
   b) receiving data and start address information for recording the received data;
   c) performing an optimum power control (OPC) in at least one data recording region of the optical recording medium based on the data recording region on which data is to be recorded, the at least one data recording region including a data recording region that is different from the data recording region on which data is to be recorded;
   d) setting a laser recording power suitable for recording the received data in the data recording region corresponding to the start address based on the OPC; and
   e) recording the received data in the data recording region corresponding to the start address using the set laser recording power.

2. The method of claim 1, wherein prior to step c), the method further comprises:
   f) recognizing the optical recording medium; and
   g) performing steps c), d), and e) if the optical recording medium is not recognized in step f).

3. The method of claim 2, further comprising:
   h) obtaining a stored laser power setting associated with the data recording region corresponding to the start address when step f) recognizes the optical recording medium; and
   i) recording the received data in the data recording region corresponding to the start adddress using the obtained laser power setting.

4. The method of claim 2, wherein:
   the step c) performs the OPC in the data recording region corresponding to the start address and each data recording region following the data recording region corresponding to the start address; and
   the step d) sets a laser recording power suitable for recording the data in each of the data recording regions for which step c) performed the OPC based on the OPC for each respective data recording region.

5. The method of claim 4, further comprising:
   h) storing the set laser recording powers in association with an identifier of the laser recording medium and the respective data recording region.

6. The method of claim 4, wherein step e) uses the set laser recording power corresponding to each data recording region when recording data therein.

7. The method of claim 1, wherein:
   the step c) performs the OPC in the data recording region corresponding to the start address and each data recording region following the data recording region corresponding to the start address;
   the step d) sets a laser recording power suitable for recording the data in each of the data recording regions for which step c) performed the OPC based on the OPC for each respective data recording region.

8. The method of claim 7, wherein step e) uses the set laser recording power corresponding to each data recording region when recording data therein.

* * * * *